US008224818B2

(12) United States Patent
Tseng et al.

(10) Patent No.: US 8,224,818 B2
(45) Date of Patent: Jul. 17, 2012

(54) MUSIC RECOMMENDATION METHOD AND COMPUTER READABLE RECORDING MEDIUM STORING COMPUTER PROGRAM PERFORMING THE METHOD

(75) Inventors: Shin-Mu Tseng, Tainan (TW);
Ja-Hwung Su, Kaohsiung County (TW);
Hsin-Ho Yeh, Yunlin County (TW)

(73) Assignee: National Cheng Kung University, Tainan (TW)

( * ) Notice: Subject to any disclaimer, the term of this patent is extended or adjusted under 35 U.S.C. 154(b) by 225 days.

(21) Appl. No.: 12/691,747

(22) Filed: Jan. 22, 2010

(65) Prior Publication Data

US 2011/0184948 A1    Jul. 28, 2011

(51) Int. Cl.
*G06F 17/30* (2006.01)
(52) U.S. Cl. ........................................ 707/732; 707/916
(58) Field of Classification Search ................... 707/732
See application file for complete search history.

(56) References Cited

U.S. PATENT DOCUMENTS

| | | | | |
|---|---|---|---|---|
| 6,633,903 B1 * | 10/2003 | Gould | ........................... | 709/205 |
| 6,957,226 B2 * | 10/2005 | Attias | ................................... | 1/1 |
| 2008/0281590 A1 * | 11/2008 | Breebaart et al. | .............. | 704/231 |
| 2011/0112994 A1 * | 5/2011 | Goto et al. | ....................... | 706/12 |

OTHER PUBLICATIONS

Jian et al., Perceptual analysis for musical segmentation, Storage and Retrieval Methods and Applications for Multimedia 2004.*
MP3, Feb. 24, 2008, wiki.hydrogenaudio.com.*
Pye, Content-based methods for the management of digital music, IEEE International Conference on Acoustics, Speech, and Signal Processing, 2000. ICASSP '00.*
Williamson, D. S. (2007). Automatic Music Similarity Assessment and Recommendation. Published Masters' Thesis, Department of Electrical and Computer Engineering, Drexel University, Philadelphia, PA.*
1. Unifying User-based and Item-based Collaborative Filtering Approaches by Similarity Fusion/Jun Wang, Arjen P. de Vries, Marcel J.T. Reinders/Information and Communication Theory Group, Faculty of Electrical Engineering, Mathematics and Computer Science, Delft University of Technology/SIGIR '06, Aug. 6-11, 2006, Seattle, Washington, USA/ACM 1-59593-369-7/06/0008.
An Open Architecture for Collaborative Filtering of Netnews/Paul Resnick, Neophytos Iacovou, Mitesh Suchak, Peter Bergstrom, John Riedl/Proceedings of ACM 1994 Conference on Computer Supported Cooperative Work, Chapel Hill, NC: pp. 175-186.

* cited by examiner

*Primary Examiner* — James Trujillo
*Assistant Examiner* — William Spieler
(74) *Attorney, Agent, or Firm* — CKC & Partners Co., Ltd.

(57) ABSTRACT

A music recommendation method and a computer readable recording medium storing a computer program performing the method are provided. In the music recommendation method, music items and rating data matrix comprising ratings and user IDs are first provided. Then, the ratings of each music item are classified into positive ratings and negative ratings. Thereafter, a pre-processing phase comprising a frame-based clustering step and a sequence-based clustering step is performed to transform the music items into perceptual patterns. Then, a prediction phase is performed to determine an interest value of a plurality of target music items for an active user. Thereafter, the target music items arranged into a music recommendation list in accordance with the first interest value and the second interest values, wherein the music recommendation list is a reference for the active user to select one of the target items.

20 Claims, 19 Drawing Sheets

200

Start

201 dividing each of the music items into sections thereby obtaining a plurality of frames — 211 calculating Modified Discrete Cosine Transform (MDCT) coefficients of each of the frames — 212

210 performing a frame-based clustering step to transform the items into first symbolic strings — 213 performing a sequence-based clustering step to transform the first symbolic strings to second symbolic strings — 214

End

Fig. 2a

|       | itm₃ | itm₂ | itm₄ | itm₁ | itm₅ | itm₆ |
|-------|------|------|------|------|------|------|
| David | 0    | 0    | 5    | 3    | 0    | 0    |
| Alice | 0    | 1    | 0    | 2    | 0    | 0    |
| Eric  | 0    | 0    | 0    | 3    | 3    | 3    |
| Andre | 0    | 2    | 2    | 0    | 0    | 0    |
| Ben   | 0    | 2    | 3    | 0    | 3    | 3    |
| Juice | 0    | 2    | 0    | 0    | 3    | 0    |

|  | 1 | 2 | 3 | 4 | 5 | 6 | 7 | 8 | 9 | 10 | 11 | 12 |
|---|---|---|---|---|---|---|---|---|---|---|---|---|
| $itm_1$ |  | C | B | A | D | C | C | B | A | D | D | C |
| $itm_2$ | A | D | D | C | C | B | A | D | D | C | A | C |
| $itm_3$ |  |  |  |  | C | B | A | D | D | C | A | C |
| $itm_4$ | D | C | C | B | A | D | D | C | C | B | A | E |
| $itm_5$ |  |  | C | B | A | E | D | C | C | B | A | E |

Fig. 7a

| | Music Snippet List | | | | |
|---|---|---|---|---|---|
| itm₁ | CDDA | DABC | BCCD | CDAB | |
| itm₂ | CACD | CDDA | DABC | BCCD | CDDA |
| itm₃ | CDDA | CDDA | DABC | | |
| itm₄ | EABC | BCCD | CDDA | DABC | BCCD |
| itm₅ | EABC | BCCD | CDEA | EABC | |

Fig. 7b

| Positive | Occurrence Count | Negative | Occurrence Count |
|---|---|---|---|
| itm$_1$ | 1 | itm$_1$ | 1 |
| itm$_2$ | 0 | itm$_2$ | 3 |
| itm$_3$ | 0 | itm$_3$ | 0 |
| itm$_4$ | 1 | itm$_4$ | 1 |
| itm$_5$ | 2 | itm$_5$ | 0 |

Fig. 8

| Positive Snippet | Frequency |
|---|---|
| BCCD | 5 |
| EABC | 5 |
| CDDA | 2 |
| DABC | 2 |
| CDEA | 1 |
| CDAB | 1 |

| Negative Snippet | Frequency |
|---|---|
| CDDA | 8 |
| DABC | 5 |
| BCCD | 6 |
| CACD | 3 |
| EABC | 1 |
| CDAB | 1 |

Fig. 11

| Positive Snippet | Frequency | TF | IDF |
|---|---|---|---|
| BCCD | 5 | 0.079 | 0.022 |
| EABC | 5 | 0.301 | 0.048 |

| Negative Snippet | Frequency | TF | IDF |
|---|---|---|---|
| CDDA | 8 | 0.1760 | 0.035 |
| DABC | 5 | 0.176 | 0.028 |
| BCCD | 6 | 0.079 | 0.022 |

Fig. 12

| itm₆ | BCCD: -2*2    EABC: +5 | INTEREST |
|---|---|---|
|  |  | 0.1521 |

Fig. 14

MUSIC RECOMMENDATION METHOD AND COMPUTER READABLE RECORDING MEDIUM STORING COMPUTER PROGRAM PERFORMING THE METHOD

BACKGROUND

1. Field of Invention

The present invention relates to a music recommendation method. More particularly, the present invention relates to a music recommendation method for mining a user's preferable perceptual patterns from music pieces.

2. Description of Related Art

Recent advances in music compression technologies have eased the access of music pieces. Through the modern communication tools, a user may purchase music items, such as songs, from online e-commerce stores, such as Amazon, Flickr, Google, and Youtube, without visiting the physical music stores in person. However, it is not easy for the user to identify what her/his favorite music items are from a huge amount of available music pieces. This enables a large increase in the number of music recommender systems. In conventional recommender systems, the user's preference is represented by using a rating scale of one to five. Based on the rating scale, the user's preference and the music items can be bridged reasonably by machine-learning techniques, thereby predicting the ratings of un-purchased music items for a user, thereupon deriving the ranking list of the un-purchased items.

Collaborative filtering (CF) is a typical recommendation paradigm, and the basic assumption behind the CF is that, if users conduct similar behaviors on rating music items, they have correlated interests on the music items. That is, the users with similar rating behaviors are always grouped together to assist each other in making a selection decision among a number of music items. Mostly, CF has been shown to be effective on predicting users' preferences. However, CF-based methods still incur a rating diversity problem, meaning that similar ratings fail to represent the user's preferences on the contents of the musical items precisely. On one hand, two different kinds of music items could be similar on having high rating coefficients. On the other hand, the ratings of one specific music item could be diverse extremely. Whatever it is, it is not east to derive the correct recommendation result merely by users' ratings.

Hence, there is a need to provide a music recommendation method for overcoming the problem of rating diversity described above.

SUMMARY

An aspect of the present invention is to provide a music recommendation method and a readable recording medium storing a computer program performing the method for overcoming the problem of rating diversity and enhancing the quality of music recommendation.

According to an embodiment of the present invention, in the music recommendation method, at first, a plurality of music items and a rating data matrix are provided. The rating data matrix includes a plurality of music item identifications for the respective music items, a plurality of ratings belonging to each of the music items, and a plurality of user identifications of a plurality of users providing the ratings. Then, the ratings of each of the music items are classified into positive ratings and negative ratings in accordance with a predetermined rating threshold. Thereafter, a pre-processing phase is performed to transform the music items into a plurality of perceptual patterns in accordance with acoustical and temporal features of the music items. Then, a prediction phase is performed to determine an interest value of each of a plurality of target music items for an active user in accordance with the perceptual patterns, and generate a music recommendation list in accordance with the interest values of the target music items, wherein the target music items are the music items not provided a rating by the active use, and the music recommendation list includes the target items arranged in accordance with the interest values, and thus the music recommendation list is provided as a reference for the active user to select one of the target items.

BRIEF DESCRIPTION OF THE DRAWINGS

These and other features, aspects, and advantages of the present invention will become better understood with regard to the following description, appended claims, and accompanying drawings where:

FIG. 2a illustrates a flow chart showing the pre-processing phase in accordance with the embodiment of the present invention;

FIG. 4 is an exemplary schematic diagram showing a user-item rating matrix according to the embodiment of the present invention;

FIG. 7a is an exemplary schematic showing perceptual pattern strings of the most-relevant items;

FIG. 7b is an exemplary schematic showing a music snippet list of the most-relevant items;

FIG. 8 is an exemplary schematic diagram showing a positive occurrence count value and a negative occurrence count value of the most-relevant music items;

FIG. 11 is an exemplary schematic diagram showing positive and negative snippet types and the frequencies thereof;

FIG. 12 is an exemplary schematic diagram showing TF and IDF of each relevant snippet type;

FIG. 14 is an exemplary schematic diagram showing matching snippet types and interest value of a target music item.

DESCRIPTION OF THE PREFERRED EMBODIMENTS

Figure 1:
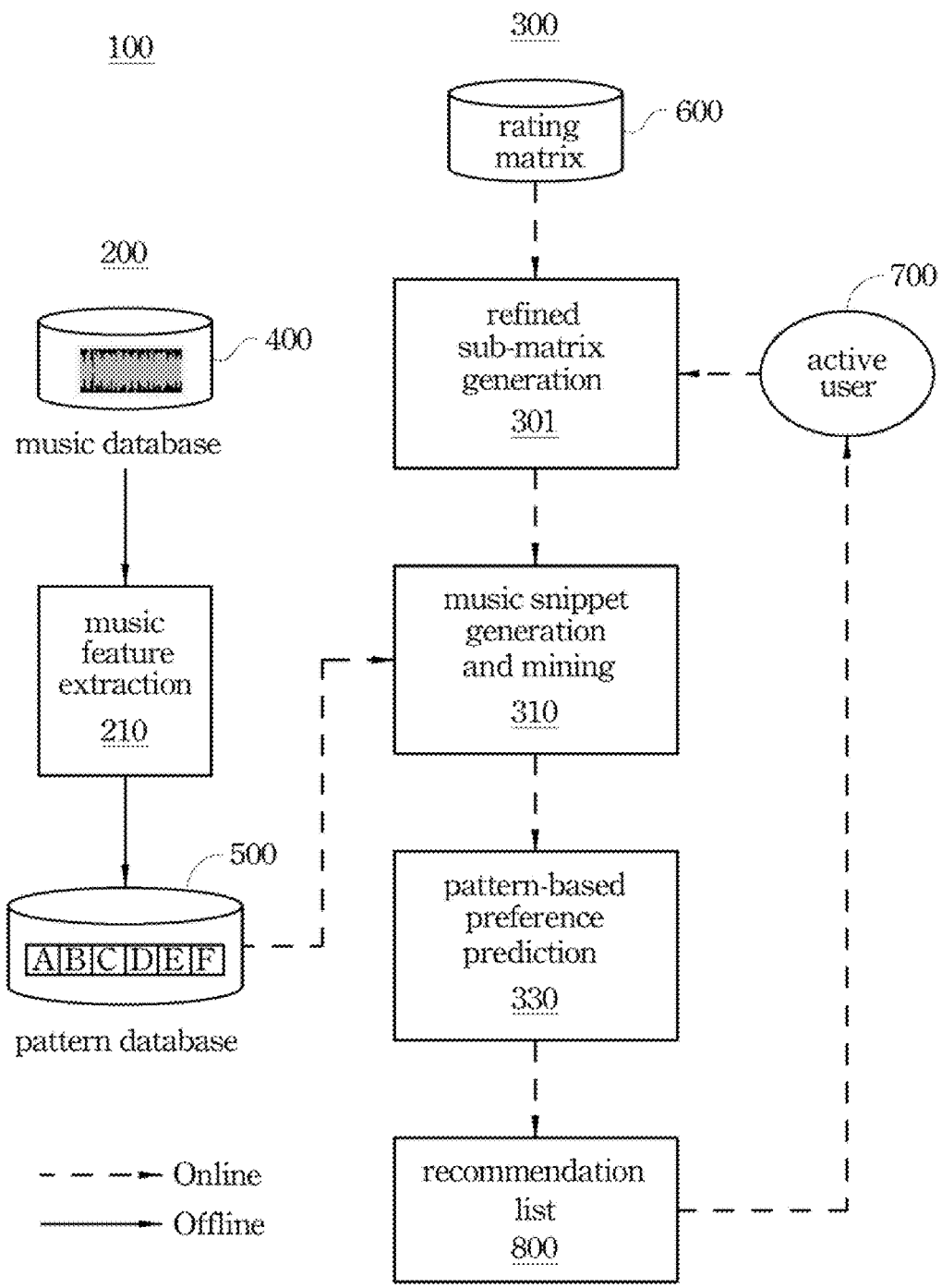
FIG. 1 is a flow chart showing a music recommendation method in accordance with an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a flow chart showing a music recommendation method 100 in accordance with an embodiment of the present invention. The music recommendation method 100 can be divided into a pre-processing phase 200 and a prediction phase 300. In the pre-processing phase 200, a music feature extraction step 201 is first performed to divide the music items stored in a music database 400 into a plurality of frames, and extract music features of each of the frames. Then, a two-stage clustering and symbolization step 210 is performed to transform the frames into perceptual patterns 500. The two-stage clustering and symbolization step 210 includes a frame-based clustering step and a sequence-based clustering step to cluster the frames and the combinations of the frames, thereby extracting two important listening-sensitive features, acoustical and temporal features. In the prediction phase 300, a music snippet generation and mining step 310 is first performed to mine preference perceptual patterns in accordance with a user-item rating matrix 600 for an active user 700. Then, a pattern-based preference prediction step 330 is performed to generate a recommendation list 800 for the active user 700, wherein the recommendation list 800 includes music items not provided rating or evaluated by the active user 700 yet.

The user-item rating matrix 800 stores ratings belonging to each of the music items stored in the music database 400. The ratings of each of the music items are provided by a plurality of users. For example, after listening one of the music items, an active user may provide a rating to the music item to express his/her preference. Thus, each of the music items may correspond to a plurality of ratings provided by different active users.

Figure 2B:
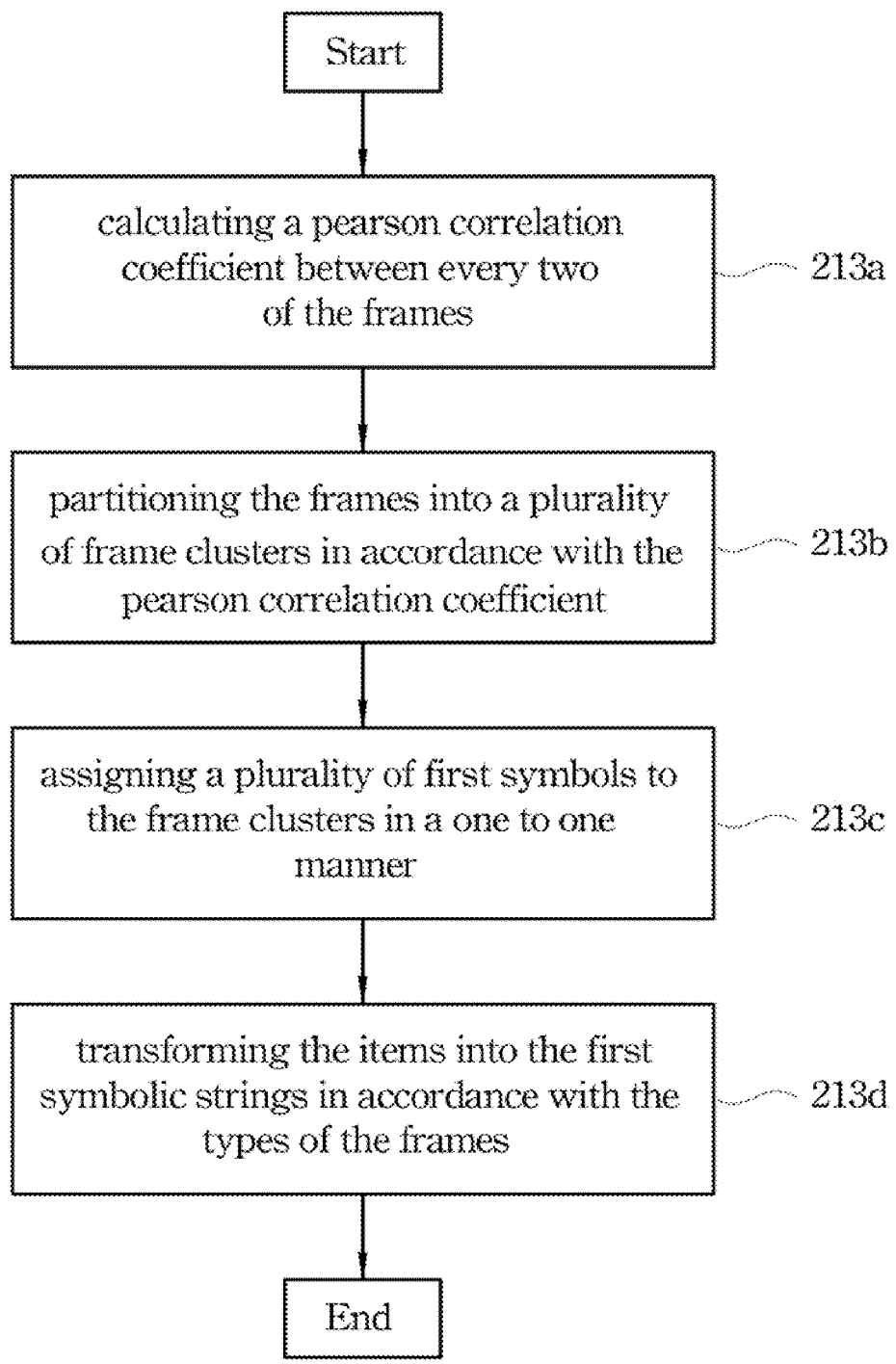
FIG. 2b illustrates a flow chart showing the frame-based clustering step in accordance with the embodiment of the present invention.
Figure 2C:
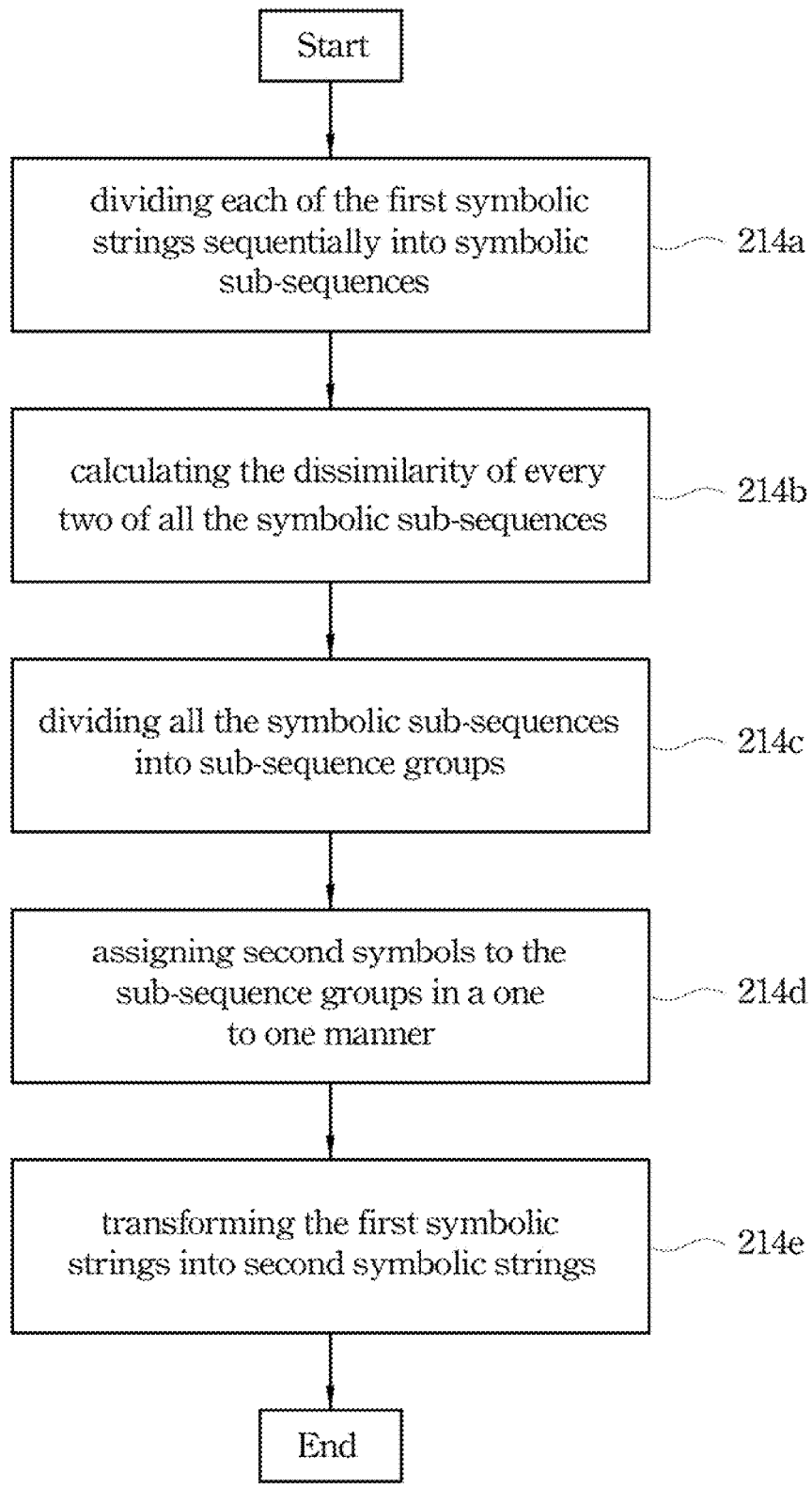
FIG. 2c illustrates a flow chart showing the sequence-based clustering step in accordance with the embodiment of the present invention.
Figure 3A:
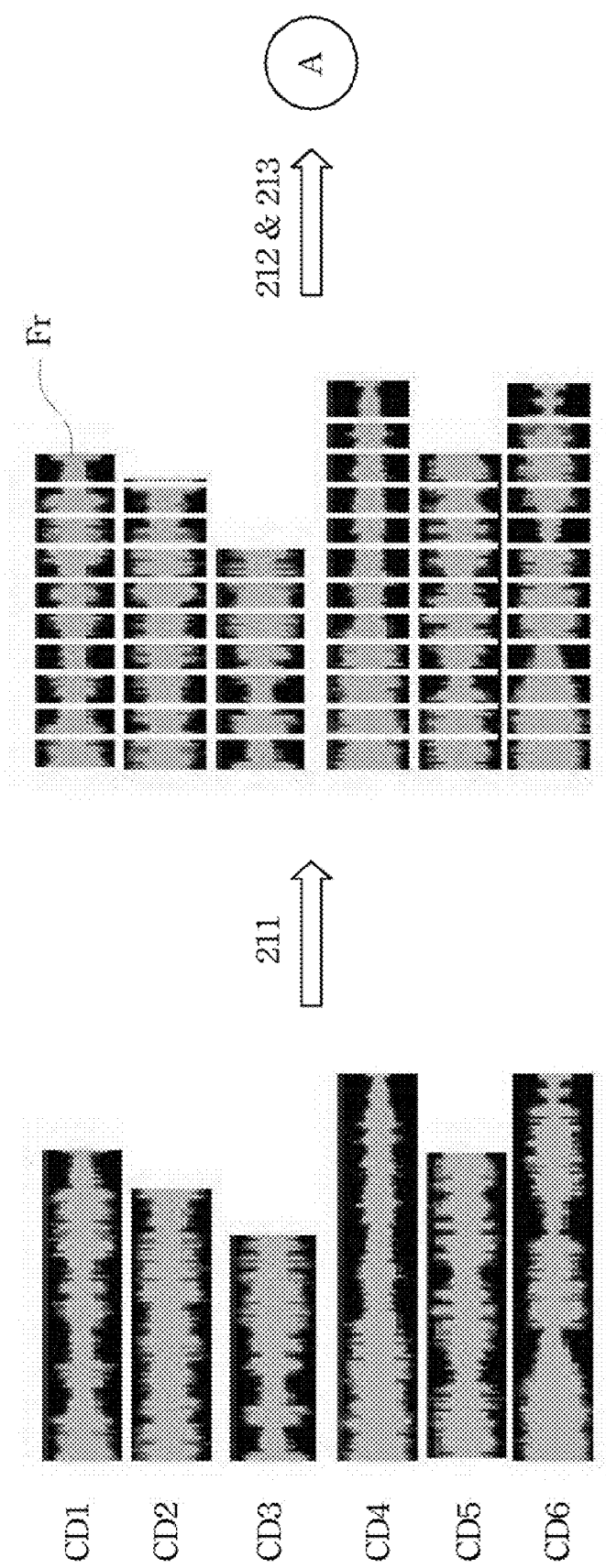
FIG. 3a to FIG. 3b are exemplary schematic diagrams for explaining the music items appearing in the music feature extraction step.
Figure 3B:
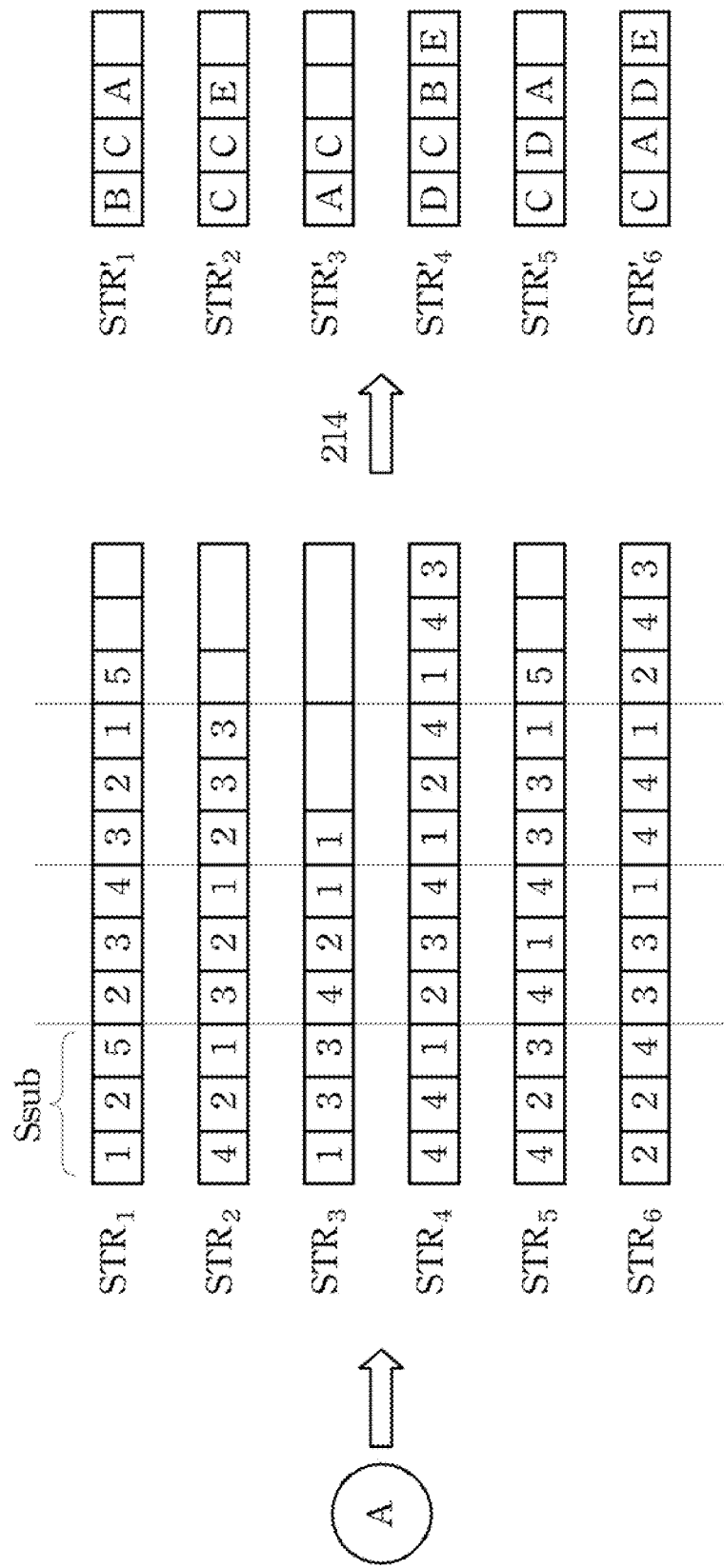

Refer to FIG. 2a to FIG. 2c, and FIG. 3a to FIG. 3b simultaneously. FIG. 2a illustrates a flow chart showing the pre-processing phase 200. FIG. 2b illustrates a flow chart showing the frame-based clustering step 213. FIG. 2c illustrates a flow chart showing the sequence-based clustering step 214. FIG. 3a to FIG. 3b are structure diagrams of the music items corresponding to steps 201, 213 and 214. In this embodiment, as shown in FIG. 3a, the music database 400 includes music items CD1, CD2, CD3, CD4, CD5 and CD6, and all the music items are in the form of mpeg-1 audiolayer-3 (MP3), for example.

In the music feature extraction step 201, step 211 is first performed to divide each of the music items into a plurality of sections in accordance with a predetermined time period, thereby obtaining a plurality of frames Fr of the music items. In this embodiment, the predetermined time period is 1/38 second. Then, step 212 is performed to calculate Modified Discrete Cosine Transform (MDCT) coefficients of each of the frames Fr to extract low-level features of each of the frames. In general, the frame Fr can be represented by 576 MDCT coefficients, but in this embodiment, only 36 MDCT coefficients are chosen from the 576 MDCT coefficients to represent the frame Fr to reduce the computation cost of a music recommendation server.

In the two-stage clustering and symbolization step 210, a frame-based clustering step 213 is first performed to transform the music items into a plurality of symbolic strings $STR_1$, $STR_2$, $STR_3$, $STR_4$, $STR_5$, and $STR_6$ in a one to one manner in accordance with the acoustical features of the music items, as shown in FIG. 3b. Then, a sequence-based clustering step 214 is performed to transform the symbolic strings $STR_1$, $STR_2$, $STR_3$, $STR_4$, $STR_5$, and $STR_6$ into a plurality of symbolic strings $STR_1'$, $STR_2'$, $STR_3'$, $STR_4'$, $STR_5'$, and $STR_6'$ in a one to one manner in accordance with the temporal features of the music items, wherein each of the symbolic strings $STR_1'$, $STR_2'$, $STR_3'$, $STR_4'$, $STR_5'$, and $STR_6'$ are composed of perceptual patterns P.

In the frame-based clustering step 213, step 213a is first performed to calculate a pearson correlation coefficient between every two of the frames Fr, wherein the pearson correlation coefficient represents the difference of the tendency of the every two of the frames Fr. The pearson correlation coefficient used in this embodiment is described in Resnick P., Iacovou N., Suchak M., Bergatrom P., and Riedl J. (1994). Grouplens: An open architecture for collaborative filtering of netnews. Proc. ACM 1994 conf. on Computer Supported Cooperative Work. pp. 175-186, New York. The content of which is incorporated herein by reference. Then, step 213b is performed to partition the frames into a plurality of frame clusters in accordance with the pearson correlation coefficient, wherein the pearson correlation coefficient is calculated in accordance with the Modified Discrete Cosine Transform (MDCT) coefficients of the every two frames Fr. The algorithms for calculating the pearson correlation coefficients and the MDCT coefficients are well known to those who are skilled in the art, and thus are not described in detail herein. Thereafter, step 213c is performed to assign symbols, such as 1, 2, 3, 4, and 5, to the frame clusters in a one to one manner so as to classify the frames. Thereafter, step 213d is performed to transform the music items into the symbolic strings in accordance with the types of the frames Fr.

In this embodiment, the frame-based clustering step 213 can be viewed as a hierarchical splitting strategy. For each of the leaf nodes in the frame-based clustering step 213, the splitting is thresholded by two criteria, namely Proportion and Density. Proportion stands for the total number of the frames in a cluster. Density stands for the ratio between the cardinality of the frames in a confident radius and the total number of the frames in the cluster. The confident radius specifies the qualificatory area around the cluster centroid to verify the frame distribution for density. Assume that a cluster $C_j$ consists a set of frames and the c is the centroid of $C_j$. The confident radius R is defined as:

$$R = \bar{d} + \frac{1.95\sigma}{\sqrt{|C_j|}} \quad (1)$$

where $$\bar{d} = \frac{\sum_{q \in C_j}^{n} dist(q, c)}{C_j};$$

$$\sigma = \sqrt{\frac{1}{|C_j|} \sum_{q \in C_j} (q, c)^2}$$

Note that dist(q,c) denotes the distance between frame q and centroid c as follows:

$$dist(f, c) = 1 - \frac{\sum_{1 \leq i \leq |MDCT|}(mf_f^i - \overline{mf_f})(mf_e^i - \overline{mf_e})}{\sqrt{\sum_{1 \leq i \leq |MDCT|}(mf_f^i - \overline{mf_f})^2} \sqrt{\sum_{1 \leq i \leq |MDCT|}(mf_e^i - \overline{mf_e})^2}} \quad (2)$$

where $|MDCT|=36$, $-mf_f^i$ and $mf_c^i$ are the $i^{th}$ MDCT coefficient features of c respectively; $-\overline{mf_f}$ and $\overline{mf_e}$ are the mean MDCT values of frame f and centroid c respectively. For each of the leaf nodes, if the Proportion is lower than the presetting threshold or the Density is higher than the presetting threshold, the node is not split. At last, the whole splitting procedure stops where the node stops splitting.

After the frame-based clustering step 213 is performed, each of the musical items can be represented as a set of sequential symbols based on its acoustical features. According to the sequential symbols, the sequence-based clustering step 214 is performed to consider the temporal continuity of music. In the sequence-based clustering step 214, step 214a is first performed to sequentially divide each of the symbolic strings $STR_1$, $STR_2$, $STR_3$, $STR_4$, $STR_5$, and $STR_6$ into a plurality of symbolic sub-sequences $S_{sub}$ in accordance with a predetermined number of the frames. In this embodiment, for example, when the predetermined number is 3, the symbolic sub-sequence of this embodiment is composed of 3 frames Fr. Then, step 214b is performed to use a sequence alignment-like algorithm to calculate the dissimilarity of every two of all the symbolic sub-sequences $S_{sub}$ of the symbolic strings STR1, STR2, STR3, STR4, STR5, and STR6.

The sequence alignment-like algorithm, such as an algorithm introduced in the article, "A general method applicable to the search for similarities in the amino acid sequence of two proteins," written by B. Needleman and C. D. Wunsch, is often used in biotechnology. The basic idea of sequence alignment-like similarity is that it gives the low penalty if two sequences exist mismatch, such as "123" and "143", and the high penalty if two sequences exist gap, such as "123" and "1-3". The gaps are inserted to align the similar sequence in the successive subsequence. For example, with respect to two sequences "125341452" and 132534142", the gap "-" is inserted between "1" and "25341452" within the sequence 125341452" so as to form "1-25341452". Hence, the aligned sequence "1-25341452" is more similar to the target sequence "132534142" than the original sequence is.

After the dissimilarity of every two of the symbolic sub-sequences $S_{sub}$ is calculated, step 214c is performed to apply a clustering algorithm onto all the symbolic sub-sequences $S_{sub}$ to divide all of the symbolic sub-sequences $S_{sub}$ into a plurality of sub-sequence groups in accordance with the dissimilarity. In this embodiment, the clustering algorithm is a K-means algorithm. Then, step 214d is performed to assign symbols, such as A, B, C, D, and E, to the sub-sequence groups in a one to one manner, thereby classifying the sub-sequence $S_{sub}$ into perceptual patterns. Thereafter, step 214e is performed to transform the symbolic string $STR_1$, $STR_2$, $STR_3$, $STR_4$, $STR_6$, and $STR_6$ into the symbolic strings $STR_1'$, $STR_2'$, $STR_3'$, $STR_4'$, $STR_6'$, and $STR_6'$ in accordance with the sub-sequence groups of each of the symbolic string $STR_1$, $STR_2$, $STR_3$, $STR_4$, $STR_6$, and $STR_6$, wherein each of the symbolic strings $STR_1'$, $STR_2'$, $STR_3'$, $STR_4'$, $STR_5'$, and $STR_6'$ represents a sequence composed of at least one of the perceptual patterns P, and thus the symbolic strings $STR_1'$, $STR_2'$, $STR_3'$, $STR_4'$, $STR_5'$, and $STR_6'$ are also called "perceptual pattern strings". Therefore, all of the music items CD1, CD2, CD3, CD4, CD5 and CD6 can be represented by the perceptual pattern strings $STR_1'$, $STR_2'$, $STR_3'$, $STR_4'$, $STR_5'$, and $STR_6'$.

According to the above description, all the music items stored in the music database are transformed into perceptual patterns P by using the frame-based clustering step 213 and the sequence-based clustering step 214, and all the music items are represented in the form of the perceptual pattern strings, as shown in FIG. 3b. In the prediction phase 300, the perceptual patterns P and the symbolic strings are used to calculate the interest value of the music item with respect to an active user.

In the prediction phase 300, an active user can access a music recommendation sever for music recommendation function through Internet. When the request for music recommendation is received by the music recommendation sever, the refined sub-matrix generation step 301, the music snippet generation and mining step 310 and the pattern-based preference prediction step 330 will be processed and repeated to calculate the interest value of each of target music items, wherein the target music items are the music items which have not been rated by the active user yet.

Referring to FIG. 4, FIG. 4 is a diagram showing a user-item rating matrix 900 according to an embodiment of the present invention. The user-item rating matrix 900 stores the ratings of all music items $itm_1$, $itm_2$, $itm_3$, $itm_4$, $itm_5$, and $itm_6$, and the user identifications David, Alice, Eric, Andre, Ben, and Juice corresponding thereto. In addition, rating "0" represents that the music item is not provided with a rating by a user. For example, the user Andre does not listen to the music item $itm_1$ yet, and thus the rating of the music item $itm_1$, corresponding to the user Andre, is 0.

For finding a refined sub-matrix, the refined sub-matrix generation step 301 is performed to apply a collaborative filtering algorithm on the rating data matrix 600 with respect to the active user and a target music item, and thus the refined sub-matrix including most-relevant users and most-relevant items obtained from the music items is obtained. As shown in FIG. 4, in this embodiment, the active user is Juice, and the target music item is $itm_6$. After the step 313 is performed, a refined sub-matrix (shown in a doted block) is obtained, wherein the users Alice, Eric, Andre, and Ben are the most-relevant users, and the music items $itm_1$, $itm_2$, $itm_3$, $itm_4$, and $itm_5$ are the most-relevant items.

Figure 5A:
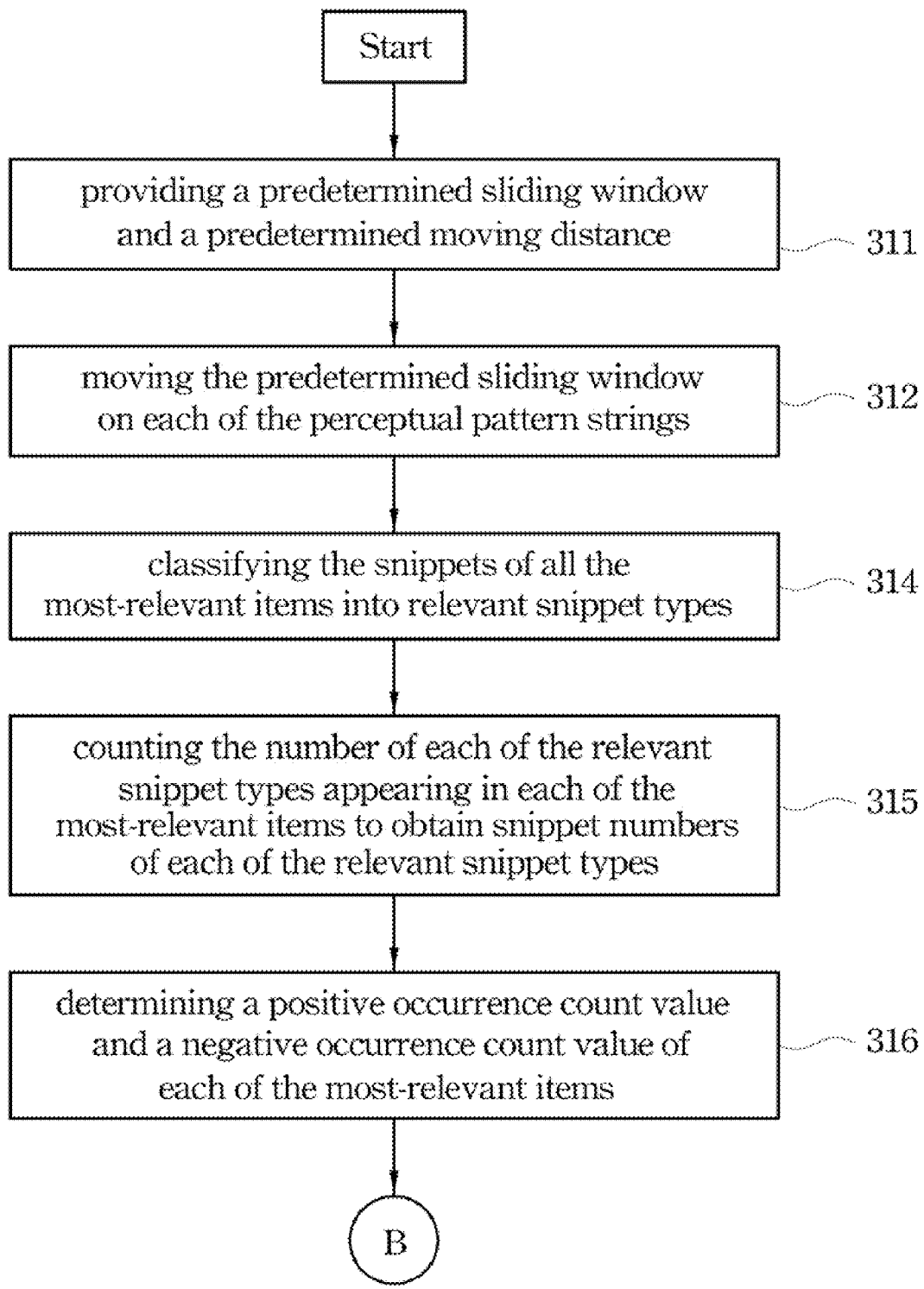
FIG. 5a to FIG. 5b illustrate a flow chart showing a music snippet generation and mining step.
Figure 5B:
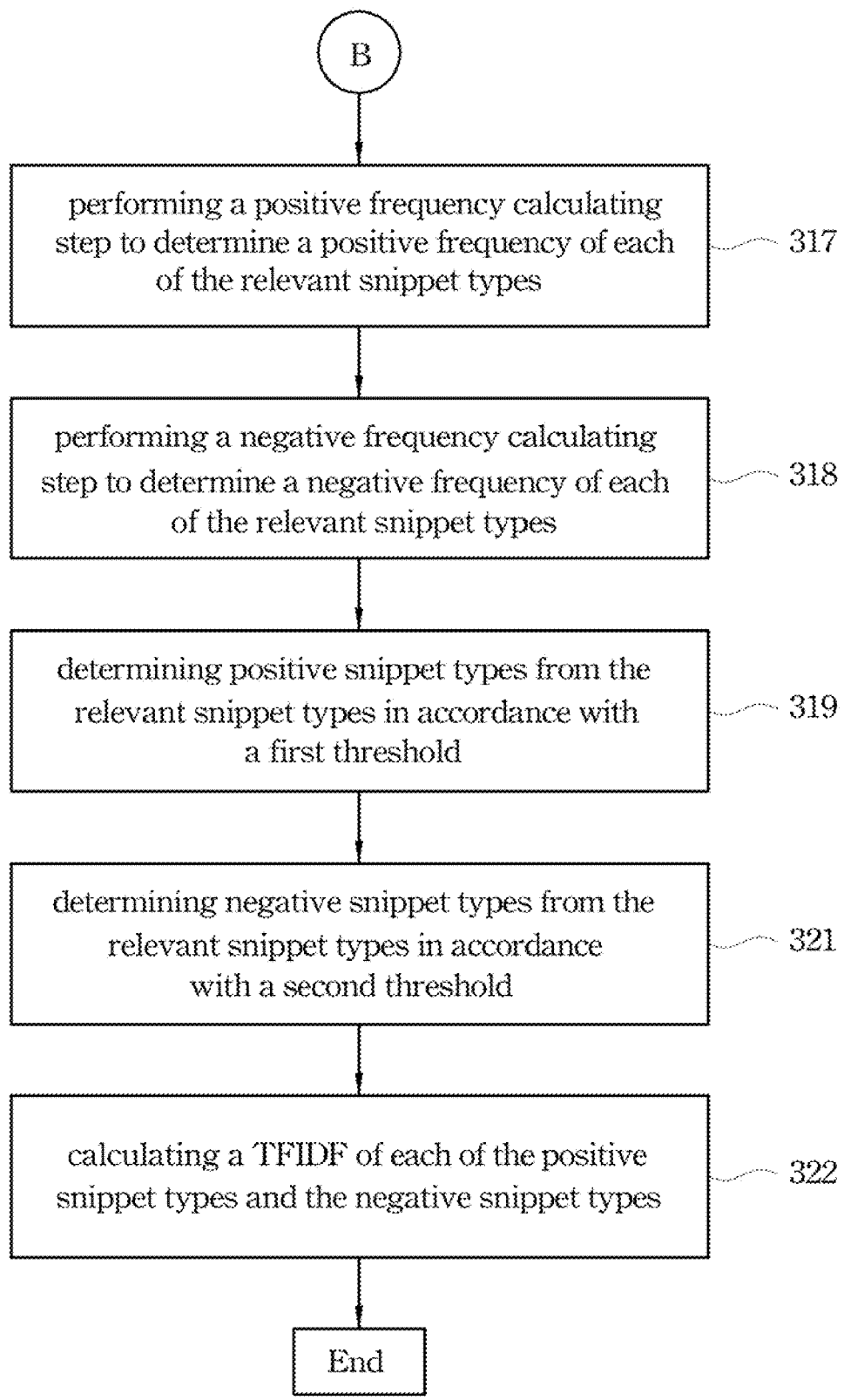
Figure 6:
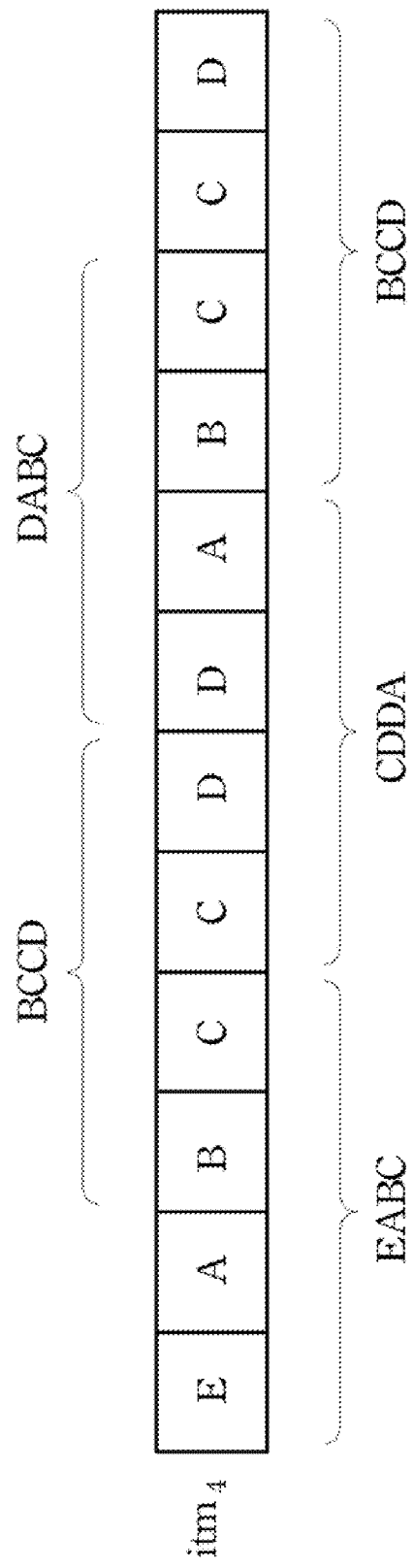
FIG. 6 is an exemplary schematic diagram showing the most-relevant music item.

Referring to FIG. 5a to FIG. 5b, FIG. 5a to FIG. 5b illustrate a flow chart showing the music snippet generation and mining step 310. In the music snippet generation and mining step 310, step 311 is first performed to provide a predetermined sliding window and a predetermined moving distance. The size of the sliding window is equal to a predetermined number of the perceptual patterns, and the length of predetermined moving distance is equal to a second predetermined number of the perceptual patterns. Then, step 312 is performed to move the predetermined sliding window onto each of the second symbolic strings in accordance with the predetermined moving distance to obtain a plurality of snippets, wherein each of the snippets has a perceptual pattern sequence. As shown in FIG. 6, in this embodiment, the sliding window is equal to 4 perceptual patterns, and the predetermined moving distance is equal to 2 perceptual patterns, and thus after the music item $itm_4$ composed of perceptual pattern types {E, A, B, C, C, D, D, A, B, C, C, D} is processed by the step 312, the perceptual pattern subsequences {E, A, B, C}, {B, C, C, D}, {C, D, D, A,}, {D, A, B, C}, and {B, C, C, D} are obtained. Those perceptual pattern subsequences obtained through the step 312 are called "snippet" in the following description.

Thereafter, step 314 is performed to classify the snippets of all the most-relevant items into relevant snippet types in accordance with the perceptual pattern sequence of each of the most-relevant items. As mentioned above, each of all the music items stored in the music database are already transformed into the perceptual pattern strings composed of snippets, and thus the step 314 can classify the snippets of all the most-relevant items in accordance with the content thereof. For example, as shown in FIG. 6, the music item $itm_4$ can be processed to obtain the perceptual pattern subsequences {E, A, B, C}, {B, C, C, D}, {C, D, D, A,}, {D, A, B, C}, and {B, C, C, D}, and thus the music item $itm_4$ corresponds to the snippet types {E, A, B, C}, {B, C, C, D}, {C, D, D, A,}, and {D, A, B, C}, and the snippet types of the most-relevant items are called relevant snippet types. The perceptual pattern strings of the most-relevant items are shown in FIG. 7a, and the music snippet list of the most-relevant items is shown in FIG. 7b.

Thereafter, step 315 is performed to count the number of each of the relevant snippet types appearing in each of the most-relevant items, thereby obtaining a plurality of snippet numbers of each of the relevant snippet types corresponding to the most-relevant items. For example, as shown in FIG. 7b, the most-relevant item $itm_4$ have snippet types {E, A, B, C}, {B, C, C, D}, {C, D, D, A,}, and {D, A, B, C}, and the number of the relevant snippet type {B, C, C, D} is 2, because the music item $itm_4$ have 2 relevant snippets {B, C, C, D}. Therefore, the snippet number of the relevant snippet type {E, A, B, C} appearing in $itm_4$ is 1; the snippet number of the relevant snippet type {B, C, C, D} appearing in $itm_4$ is 2; the snippet number of the relevant snippet type {C, D, D, A,} appearing in $itm_4$ is 1; the snippet number of the relevant snippet type {D, A, B, C} appearing in $itm_4$ is 1.

Then, step 316 is performed to determine a positive occurrence count value and a negative occurrence count value of each of the most-relevant items. The positive occurrence count value is the number of positive ratings of each of the most-relevant items and the negative occurrence count value is the number of negative ratings of each of the most-relevant items. In this embodiment, the ratings of the music items are classified into positive ratings and negative ratings. The rating having value greater than 2 is considered to belong to the positive rating, and the rating having value smaller than 3 and greater than 0 is considered to belong to the negative rating. Thus, as shown in FIG. 4, the music item $itm_4$ has one positive rating and one negative rating, and the positive occurrence count value of the most-relevant music item $itm_4$ is 1 and the negative occurrence count value of the most-relevant music item $itm_4$ is 1. The positive occurrence count value and the negative occurrence count value of the most-relevant music items are shown in FIG. 8.

Figure 9:
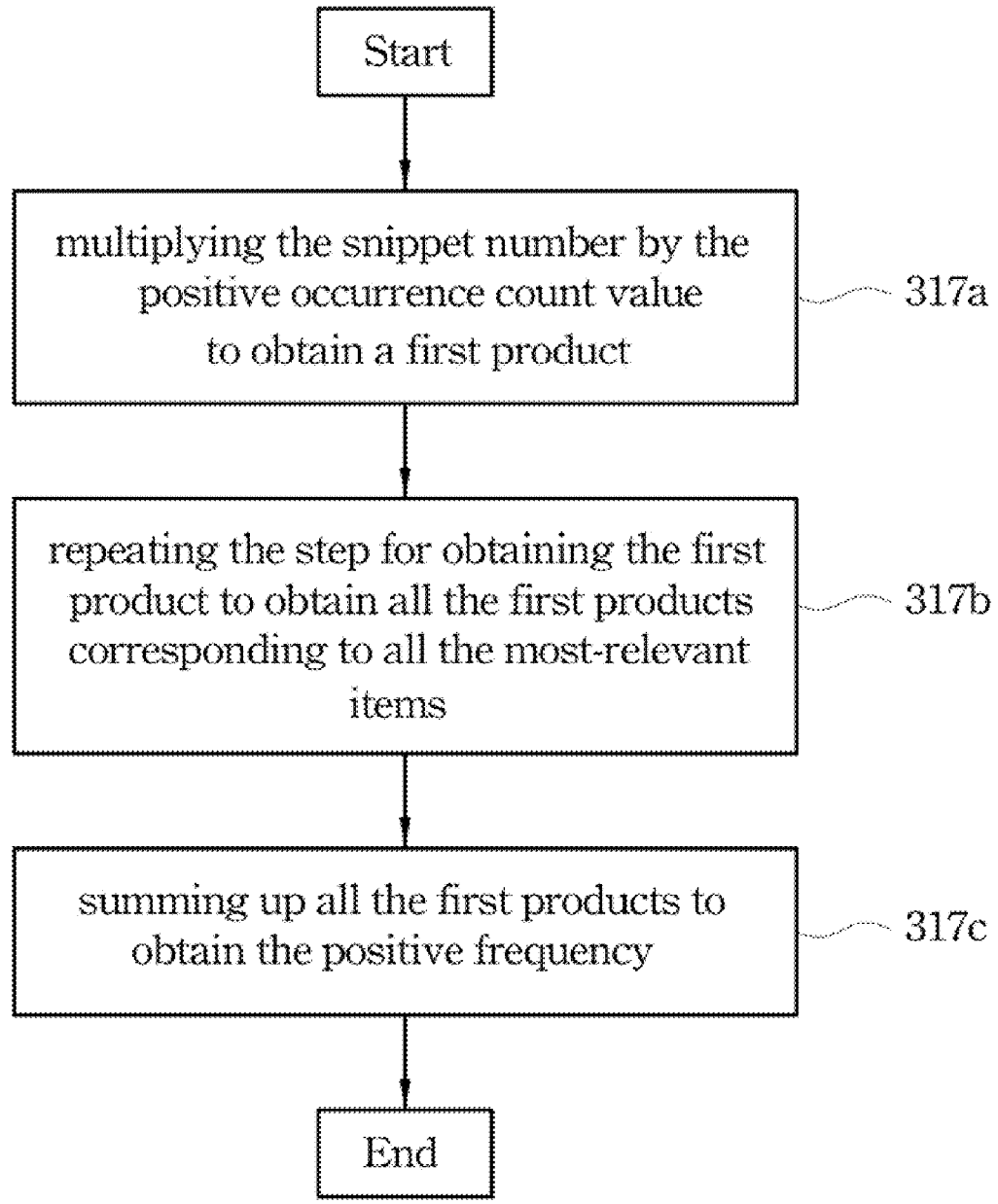
FIG. 9 is a flow chart showing a positive frequency calculating step.

Thereafter, a positive frequency calculating step 317 is performed to determine a positive frequency of each of the relevant snippet types. Referring to FIG. 9, FIG. 9 illustrates a flow chart showing the positive frequency calculating step 317. In the positive frequency calculating step 317, step 317a is first performed to multiply the snippet number of the relevant snippet type by the positive occurrence count value of the most-relevant item corresponding thereto to obtain a product corresponding to the most-relevant item. Then, step 317b is performed to repeat the step 317a to obtain all the products corresponding to all the most-relevant items. Thereafter, step 317c is performed to sum up all the products to obtain the positive frequency of the relevant snippet type.

For example, as shown in FIG. 7b and FIG. 8, the snippet numbers of the most-relevant snippet type {B, C, C, D} appearing in the most-relevant items $itm_1$, $itm_2$, $itm_3$, $itm_4$, and $itm_5$ are respectively 1, 1, 2, 1, and 2. The positive occurrence count values of the most-relevant items $itm_1$, $itm_2$, $itm_3$, $itm_4$, and $itm_5$ are respectively 1, 0, 0, 1 and 2. In the step 317a, the snippet number of the snippet type {B, C, C, D} appearing in the most-relevant items $itm_1$ is multiplied by the positive occurrence count value of the most-relevant items $itm_1$, thereby obtaining a product value 1. Then, step 317b is performed to multiply the positive occurrence count value of the most-relevant item $itm_2$ by the snippet number of the snippet type {B, C, C, D} appearing in the most-relevant items $itm_2$ to obtain a product value 0, and multiply the positive occurrence count value of the most-relevant item $itm_3$ by the snippet number of the relevant snippet type {B, C, C, D} appearing in the most-relevant items $itm_3$ to obtain a product value 0, and multiply the positive occurrence count value of the most-relevant item $itm_4$ by the snippet numbers of the relevant snippet type {B, C, C, D} appearing in the most-relevant items $itm_4$ to obtain a product value 2, and multiply the positive occurrence count value of the most-relevant item $itm_5$ by the snippet numbers of the relevant snippet type {B, C, C, D} appearing in the most-relevant items $itm_5$ to obtain a product value 2. Then, in the step 317c, the products are summed up to obtain the positive frequency of the relevant snippet type {B, C, C, D}.

Figure 10:
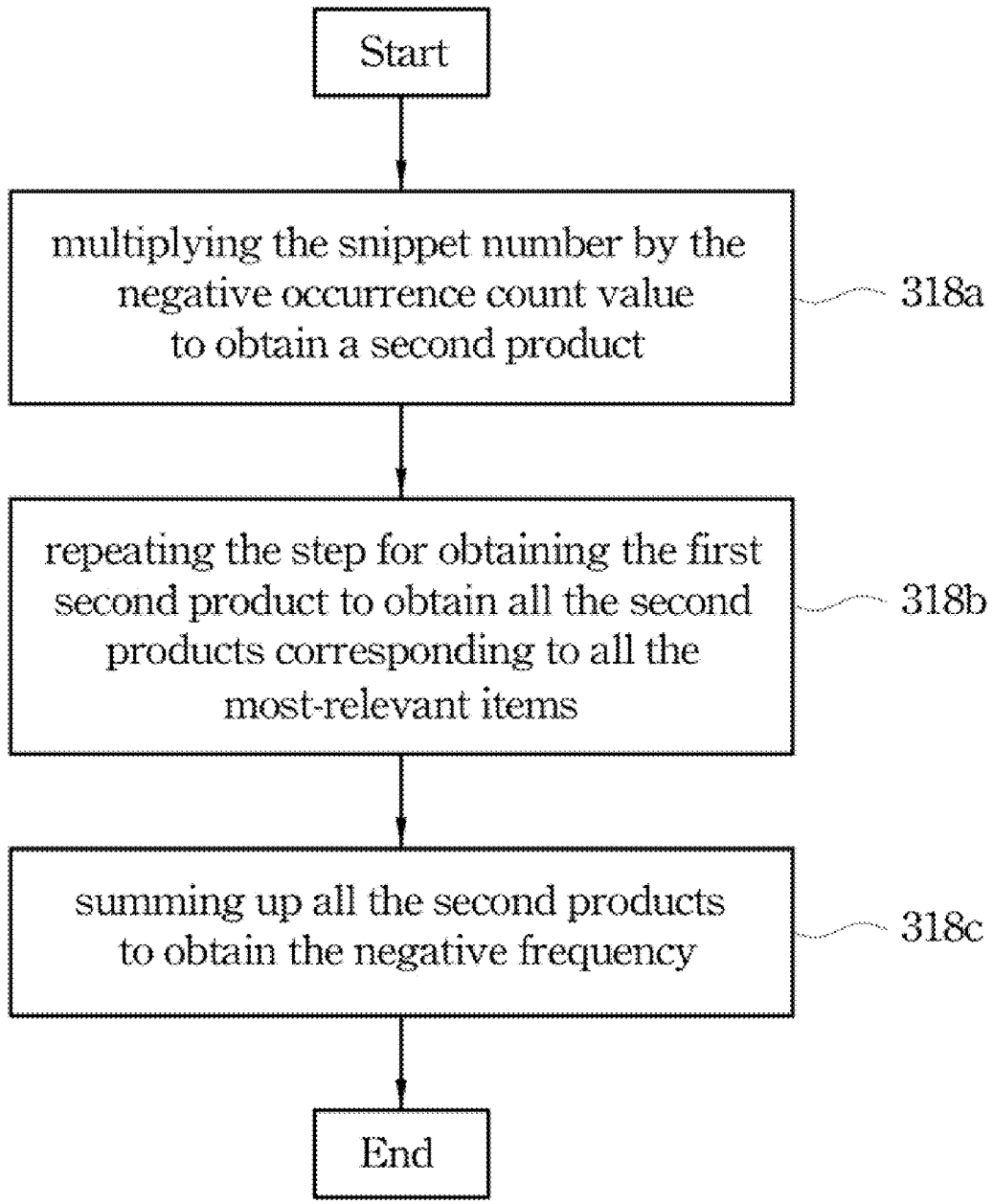
FIG. 10 is a flow chart showing a negative frequency calculating step.

After all the positive frequencies of the relevant snippet types are calculated, step 318 is performed to calculate to determine a negative frequency of each of the relevant snippet types. Referring to FIG. 10, FIG. 10 illustrates a flow chart showing the negative frequency calculating step 318. In the negative frequency calculating step 318, step 318a is first performed to multiply the snippet number of the relevant snippet type by the negative occurrence count value of the most-relevant item corresponding thereto to obtain a product corresponding to the most-relevant item. Then, step 318b is performed to repeat the step 318a to obtain all the products corresponding to all the most-relevant items. Thereafter, step 318c is performed to sum up all the products to obtain the negative frequency of the relevant snippet type.

For example, as shown in FIG. 7b and FIG. 8, the snippet numbers of the most-relevant snippet type {B, C, C, D} appearing in the most-relevant items $itm_1$, $itm_2$, $itm_3$, $itm_4$, and $itm_5$ are respectively 1, 1, 2, 1, and 2. The negative occurrence count values of the most-relevant items $itm_1$, $itm_2$, $itm_3$, $itm_4$, and $itm_5$ are respectively 1, 3, 0, 1 and 0. In the step 318a, the snippet number of the snippet type {B, C, C, D} appearing in the most-relevant items $itm_1$ is multiplied by the negative occurrence count value of the most-relevant items $itm_1$, thereby obtaining a product value 1. Then, step 318b is performed to multiply the negative occurrence count value of the most-relevant item $itm_2$ by the snippet number of the snippet type {B, C, C, D} appearing in the most-relevant items $itm_2$ to obtain a product value 6, and multiply the negative occurrence count value of the most-relevant item $itm_3$ by the snippet number of the relevant snippet type {B, C, C, D} appearing in the most-relevant items $itm_3$ to obtain a product value 0, and multiply the negative occurrence count value of the most-relevant item $itm_4$ by the snippet numbers of the relevant snippet type {B, C, C, D} appearing in the most-relevant items $itm_4$ to obtain a product value 1, and multiply the negative occurrence count value of the most-relevant item $itm_5$ by the snippet numbers of the relevant snippet type {B, C, C, D} appearing in the most-relevant items $itm_5$ to obtain a product value 0. Then, in the step 318c, the products are summed up to obtain the negative frequency of the relevant snippet type {B, C, C, D}.

After all the negative frequencies of the relevant snippet types are calculated, step 319 is performed to determine a plurality of positive snippet types from the relevant snippet types in accordance with a first threshold, wherein the positive frequency of each of the positive snippet types is greater than the first threshold. In this embodiment, the first threshold is equal to the sum of the positive occurrence count values of all the most-relevant items.

Then, step 321 is performed to determine a plurality of negative snippet types from the relevant snippet types in accordance with a second threshold, wherein the negative frequency of each of the negative snippet types is greater than the first threshold. In this embodiment, the second threshold is equal to the sum of the negative occurrence count values of all the most-relevant items.

The positive and negative snippet types and the frequency thereof are shown in FIG. 11. It is noted that the relevant snippet type, such as the snippet type {B, C, C, D}, can belong to the positive snippet type and the negative snippet type at the same time. Thereafter, step 322 is performed to calculate a term frequency inverse document frequency (TFIDF) of each of the positive snippet types and the negative snippet types. TFIDF represents the weight of the snippet ts. Suppose there exists a set of distinct snippets DS in music item database I, and ts is one of DS. The TFIDF for ts is defined as:

where –  (3)

$$TF_{ts} = \frac{\text{the number of occurences of } ts \text{ in } I}{\sum_{ds \in DS} \text{the number of occurences of } ds \text{ in } I}$$

$$IDF_{ts} = \log \frac{\text{the number of music items}}{\text{the number of music item containing } ts}$$

The TFIDF represents the importance of each of the positive snippet types and the negative snippet types, and the TFIDF of each of the relevant snippet types is shown in FIG. 12.

According to the above descriptions, the music snippet generation and mining step 310 is used to mine preference perceptual patterns in accordance with the refined sub-matrix and calculate the TFIDFs of the preference perceptual patterns. In the pattern-based preference prediction step 330, the preference perceptual patterns and the TFIDFs are used to calculate the interest of the target music item $itm_6$.

Figure 13:
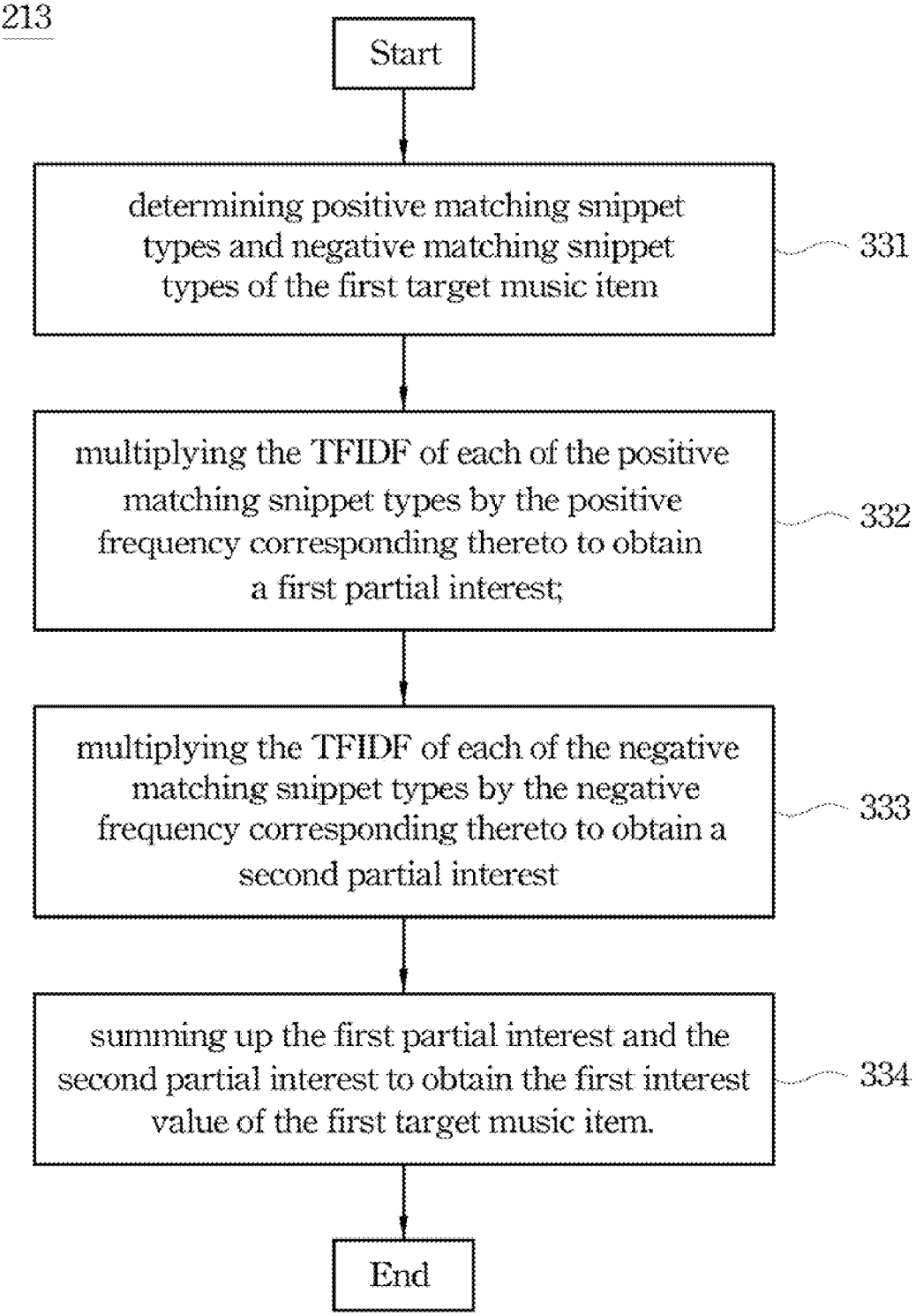
FIG. 13 is a flow chart showing a pattern-based preference prediction step.

Referring to FIG. 13, FIG. 13 illustrates a flow chart showing the pattern-based preference prediction step 330. In the pattern-based preference prediction step 330, step 331 is first performed to determine positive matching snippet types and negative matching snippet types of the target music item. The positive matching snippet types are the positive snippet types contained by the target music item, and the negative matching snippet types are the negative snippet types contained by the target music item. For example, the target music item $itm_6$ includes the positive snippet type {B, C, C, D} and {E, A, B, C} and the negative snippet type {B, C, C, D}, and thus the positive matching snippet types of the target music item $itm_6$ are the snippet types {B, C, C, D} and {E, A, B, C}, and the negative matching snippet type of the target music item $itm_6$ is the snippet type {B, C, C, D}.

Thereafter, step 332 is performed to multiply the TFIDF of each of the positive matching snippet types by the positive frequency corresponding thereto so as to obtain a partial interest. Then, step 333 is performed to multiply the TFIDF of each of the negative matching snippet types by the negative frequency corresponding thereto to obtain another partial interest. In this embodiment, the interest value is defined as:

$$\text{INTEREST}_{targetitm} = \sum_{ts \subset (targetitm \cap PF)} TFIDF \times (T\_DGREE - N\_DGREE) \quad (4)$$

where T_DEGREE and N_DEGREE stand for the accumulated positive and negative frequencies of matching snippets respectively; targetitm denotes a set of snippets; and PF denotes the set of snippets belonging to the positive snippet type.

Figure 14:
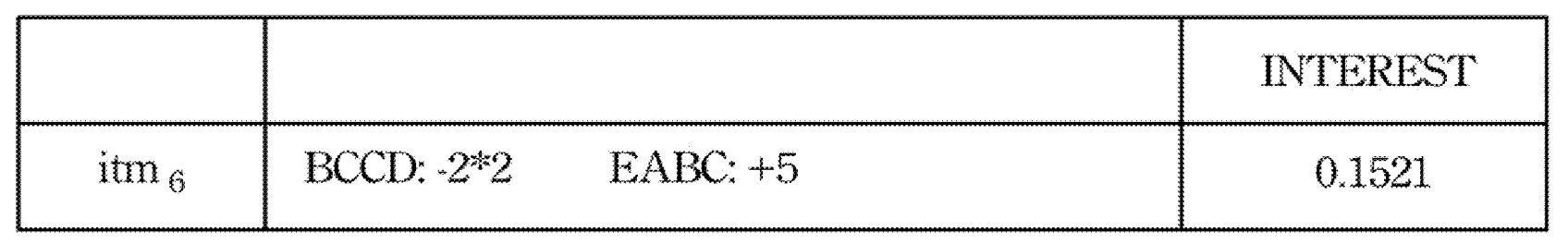

Thereafter, step 334 is performed to sum up the partial interests to obtain the interest value of the target music item for the active user. The matching snippet types and interest value of the target music item $itm_6$ is shown in FIG. 14.

In general, many music items stored in the music database have not been evaluated by the active user yet, and thus the refined sub-matrix generation step 301, the music snippet generation and mining step 310 and the pattern-based preference prediction step 330 have to repeated to calculate the interest values of all the unevaluated music items.

After the interest values of all the unevaluated music items are calculated, the music recommendation server will arrange the unevaluated music items in the recommendation list 800 in accordance with their interest values, so that the active user may decide which music items he or she is going to buy simply by looking up the recommendation list.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A music recommendation method, comprising:
providing a plurality of music items, and a rating data matrix, wherein the rating data matrix comprises a plurality of music item identifications of the music items, a plurality of ratings belonging to each of the music items, and a plurality of user identifications of a plurality of users providing the ratings;
classifying the ratings of each of the music items into positive ratings and negative ratings in accordance with a predetermined rating threshold;
performing a pre-processing phase to transform the music items into a plurality of perceptual patterns in accordance with acoustical and temporal features of the music items, wherein the pre-processing phase comprises:
dividing each of the music items into a plurality of sections in accordance with a predetermined time period, thereby obtaining a plurality of frames of the music items;
calculating Modified Discrete Cosine Transform (MDCT) coefficients of each of the frames to extract the low-level features of each of the frames;
performing a frame-based clustering step to transform the music items into a plurality of first symbolic strings in a one to one manner in accordance with the acoustical features of the music items, wherein the frame-based clustering step comprises:
calculating a pearson correlation coefficient between every two of the frames, wherein the pearson correlation coefficient represents the difference of the tendency of the every two of the frames;
partitioning the frames into a plurality of frame clusters in accordance with the pearson correlation coefficient, wherein the pearson correlation coefficient is calculated in accordance with the Modified Discrete Cosine Transform (MDCT) coefficients of the every two frames;
assigning a plurality of first symbols to the frame clusters in a one to one manner so as to classify the frames; and
transforming the music items into the first symbolic strings in accordance with the types of the frames, wherein each of the first symbolic strings is represented by a sequence code composed of at least two of the first symbols; and performing a sequence-based clustering step to transform the first symbolic strings into a plurality of second symbolic strings in a one to one manner in accordance with the temporal features of the music items; and performing a prediction phase to determine an interest value of each of a plurality of target music items for an active user in accordance with the perceptual patterns, and generate a music recommendation list in accordance with the interest values of the target music items, wherein the target music items are the music items not provided a rating by the active user, and the music recommendation list comprises the target items arranged in accordance with the interest values, and thus the music recommendation list is provided as a reference for the active user to select one of the target items.

2. The music recommendation method as claimed in claim 1, wherein the sequence-based clustering step comprises:

dividing each of the first symbolic strings sequentially into a plurality of symbolic sub-sequences in accordance with a predetermined number of the frames;

using a sequence alignment-like algorithm to calculate the dissimilarity of every two of all the symbolic sub-sequences of all the first symbolic strings;

performing a clustering algorithm onto all the symbolic sub-sequences to divide all the symbolic sub-sequences into a plurality of sub-sequence groups in accordance with the dissimilarity;

assigning a plurality of second symbols to the sub-sequence groups in a one to one manner to classify the sub-sequence into a plurality of perceptual patterns; and transforming the first symbolic strings into the second symbolic strings in accordance with the sub-sequence groups of each of the first symbolic strings, wherein each of the second symbolic strings is represented as a sequence composed of at least one of the perceptual patterns.

3. The music recommendation method as claimed in claim 2, wherein the clustering algorithm is a density-based spatial clustering of applications with noise (DBSCAN) algorithm, a K-mean clustering algorithm, a clustering using representatives (CURE) algorithm, or a balanced iterative reducing and clustering using hierarchies (BIRCH) algorithm.

4. The music recommendation method as claimed in claim 1, wherein the prediction phase comprises:

performing a refined sub-matrix generation step in accordance with the rating data matrix to perform a collaborative filtering algorithm on the rating data matrix with respect to the active user and the target music item to find a plurality of most-relevant users from the users and a plurality of most-relevant items from the music items;

performing a music snippet generation and mining step in accordance with the perceptual patterns, wherein the music snippet generation and mining step comprises:

providing a predetermined sliding window and a predetermined moving distance, wherein the size of the sliding window is equal to a first predetermined number of the perceptual patterns, and the length of predetermined moving distance is equal to a second predetermined number of the perceptual patterns;

moving the predetermined sliding window onto each of the second symbolic strings in accordance with the predetermined moving distance to obtain a plurality of snippets, wherein each of the snippets has a perceptual pattern sequence;

classifying the snippets of all of the most-relevant items into a plurality of relevant snippet types in accordance with the perceptual pattern sequence of each of the most-relevant items;

counting the number of each of the relevant snippet types appearing in each of the most-relevant items, thereby obtaining a plurality of snippet numbers of each of the relevant snippet types corresponding to the most-relevant items;

determining a positive occurrence count value and a negative occurrence count value of each of the most-relevant items, wherein the positive occurrence count value is the number of positive ratings of each of the most-relevant items and the negative occurrence count value is the number of negative ratings of each of the most-relevant items;

performing a positive frequency calculating step to determine a positive frequency of each of the relevant snippet types;

performing a negative frequency calculating step to determine a negative frequency of each of the relevant snippet types, wherein the negative frequency calculating step comprises:

determining a plurality of positive snippet types from the relevant snippet types in accordance with a first threshold, wherein the positive frequency of each of the positive snippet types is greater than the first threshold;

determining a plurality of negative snippet types from the relevant snippet types in accordance with a second threshold, wherein the negative frequency of each of the negative snippet types is greater than the first threshold; and calculating a term frequency inverse document frequency (TFIDF) of each of the positive snippet types and the negative snippet types, wherein the TFIDF represents the importance of each of the positive snippet types and the negative snippet types;

performing a pattern-based preference prediction step to calculate the interest value of the target music item in accordance with the positive snippet types and the negative snippet types, wherein the pattern-based preference prediction step comprises:

determining positive matching snippet types and negative matching snippet types of the target music item, wherein the positive matching snippet types are the positive snippet types contained by the target music item, and the negative matching snippet types are the negative snippet types contained by the target music item;

multiplying the TFIDF of each of the positive matching snippet types by the positive frequency corresponding thereto to obtain a first partial interest;

multiplying the TFIDF of each of the negative matching snippet types by the negative frequency corresponding thereto to obtain a second partial interest; and summing up the first partial interest and the second partial interest to obtain the first interest value of the target music item;

repeating the refined sub-matrix generation step, the music snippet generation and mining step and the pattern-based preference prediction step to calculate the interest values of all the music items; and arranging the target music items in a music recommendation list in accordance with the interest values.

5. The music recommendation method as claimed in claim 4, wherein the positive frequency calculating step comprises:

multiplying the snippet number of the relevant snippet type by the positive occurrence count value of the most-relevant item corresponding thereto to obtain a first product corresponding to the most-relevant item;

repeating the step for obtaining the first product to obtain all the first products corresponding to all the most-relevant items; and summing up all the first products corresponding to all the most-relevant items to obtain the positive frequency.

6. The music recommendation method as claimed in claim 4, wherein the negative frequency calculating step comprises:

multiplying the snippet number of the relevant snippet type by the negative occurrence count value of the most-relevant item corresponding thereto to obtain a second product corresponding to the most-relevant item;

repeating the step for obtaining the second product to obtain all the second products corresponding to all the most-relevant items; and summing up all the second products corresponding to all the most-relevant items to obtain the positive frequency.

7. The music recommendation method as claimed in claim 4, wherein the first threshold is equal to the sum of the positive occurrence count values of all the most-relevant items, and the second threshold is equal to the sum of the negative occurrence count values of all the most-relevant items.

8. The music recommendation method as claimed in claim 4, wherein the size of the sliding window is equal to 4 perceptual patterns, and the length of predetermined moving distance is equal to 1 perceptual pattern.

9. The music recommendation method as claimed in claim 1, wherein the length of each of the frames is equal to 1/38 second.

10. The music recommendation method as claimed in claim 1, wherein the music items are in the form of mpeg-1 audiolayer-3 (MP3).

11. A computer-readable recording medium storing a computer program performing the music recommendation method as claimed in claim 1.

12. A music recommendation method, comprising:

providing a plurality of music items, and a rating data matrix, wherein the rating data matrix comprises a plurality of music item identifications of the music items, a plurality of ratings belonging to each of the music items, and a plurality of user identifications of a plurality of users providing the ratings;

classifying the ratings of each of the music items into positive ratings and negative ratings in accordance with a predetermined rating threshold;

performing a pre-processing phase to transform the music items into a plurality of perceptual patterns in accordance with acoustical and temporal features of the music items, wherein the pre-processing phase comprises:

dividing each of the music items into a plurality of sections in accordance with a predetermined time period, thereby obtaining a plurality of frames of the music items;

calculating Modified Discrete Cosine Transform (MDCT) coefficients of each of the frames to extract the low-level features of each of the frames;

performing a frame-based clustering step to transform the music items into a plurality of first symbolic strings in a one to one manner in accordance with the acoustical features of the music items; and performing a sequence-based clustering step to transform the first symbolic strings into a plurality of second symbolic strings in a one to one manner in accordance with the temporal features of the music items, wherein the sequence-based clustering step comprises:

dividing each of the first symbolic strings sequentially into a plurality of symbolic sub-sequences in accordance with a predetermined number of the frames;

using a sequence alignment-like algorithm to calculate the dissimilarity of every two of all the symbolic sub-sequences of all the first symbolic strings;

performing a clustering algorithm onto all the symbolic sub-sequences to divide all the symbolic sub-sequences into a plurality of sub-sequence groups in accordance with the dissimilarity;

assigning a plurality of second symbols to the sub-sequence groups in a one to one manner to classify the sub-sequence into a plurality of perceptual patterns; and transforming the first symbolic strings into the second symbolic strings in accordance with the sub-sequence groups of each of the first symbolic strings, wherein each of the second symbolic strings is represented as a sequence composed of at least one of the perceptual patterns, and performing a prediction phase to determine an interest value of each of a plurality of target music items for an active user in accordance with the perceptual patterns, and generate a music recommendation list in accordance with the interest values of the target music items, wherein the target music items are the music items not provided a rating by the active user, and the music recommendation list comprises the target items arranged in accordance with the interest values, and thus the music recommendation list is provided as a reference for the active user to select one of the target items.

13. The music recommendation method as claimed in claim 12, wherein the frame-based clustering step comprises:

calculating a pearson correlation coefficient between every two of the frames, wherein the pearson correlation coefficient represents the difference of the tendency of the every two of the frames;

partitioning the frames into a plurality of frame clusters in accordance with the pearson correlation coefficient, wherein the pearson correlation coefficient is calculated in accordance with the Modified Discrete Cosine Transform (MDCT) coefficients of the every two frames;

assigning a plurality of first symbols to the frame clusters in a one to one manner so as to classify the frames; and transforming the music items into the first symbolic strings in accordance with the types of the frames, wherein each of the first symbolic strings is represented by a sequence code composed of at least two of the first symbols.

14. The music recommendation method as claimed in claim 12, wherein the prediction phase comprises:

performing a refined sub-matrix generation step in accordance with the rating data matrix to perform a collaborative filtering algorithm on the rating data matrix with respect to the active user and the target music item to find a plurality of most-relevant users from the users and a plurality of most-relevant items from the music items;

performing a music snippet generation and mining step in accordance with the perceptual patterns, wherein the music snippet generation and mining step comprises:

providing a predetermined sliding window and a predetermined moving distance, wherein the size of the sliding window is equal to a first predetermined number of the perceptual patterns, and the length of predetermined moving distance is equal to a second predetermined number of the perceptual patterns;

moving the predetermined sliding window onto each of the second symbolic strings in accordance with the predetermined moving distance to obtain a plurality of snippets, wherein each of the snippets has a perceptual pattern sequence;

classifying the snippets of all of the most-relevant items into a plurality of relevant snippet types in accordance with the perceptual pattern sequence of each of the most-relevant items;

counting the number of each of the relevant snippet types appearing in each of the most-relevant items, thereby obtaining a plurality of snippet numbers of each of the relevant snippet types corresponding to the most-relevant items;

determining a positive occurrence count value and a negative occurrence count value of each of the most-relevant items, wherein the positive occurrence count value is the number of positive ratings of each of the most-relevant items and the negative occurrence count value is the number of negative ratings of each of the most-relevant items;

performing a positive frequency calculating step to determine a positive frequency of each of the relevant snippet types;

performing a negative frequency calculating step to determine a negative frequency of each of the relevant snippet types, wherein the negative frequency calculating step comprises:

determining a plurality of positive snippet types from the relevant snippet types in accordance with a first threshold, wherein the positive frequency of each of the positive snippet types is greater than the first threshold;

determining a plurality of negative snippet types from the relevant snippet types in accordance with a second threshold, wherein the negative frequency of each of the negative snippet types is greater than the first threshold; and calculating a term frequency inverse document frequency (TFIDF) of each of the positive snippet types and the negative snippet types, wherein the TFIDF represents the importance of each of the positive snippet types and the negative snippet types;

performing a pattern-based preference prediction step to calculate the interest value of the target music item in accordance with the positive snippet types and the negative snippet types, wherein the pattern-based preference prediction step comprises:

determining positive matching snippet types and negative matching snippet types of the target music item, wherein the positive matching snippet types are the positive snippet types contained by the target music item, and the negative matching snippet types are the negative snippet types contained by the target music item;

multiplying the TFIDF of each of the positive matching snippet types by the positive frequency corresponding thereto to obtain a first partial interest;

multiplying the TFIDF of each of the negative matching snippet types by the negative frequency corresponding thereto to obtain a second partial interest; and summing up the first partial interest and the second partial interest to obtain the first interest value of the target music item;

repeating the refined sub-matrix generation step, the music snippet generation and mining step and the pattern-based preference prediction step to calculate the interest values of all the music items; and arranging the target music items in a music recommendation list in accordance with the interest values.

15. The music recommendation method as claimed in claim 14, wherein the positive frequency calculating step comprises:

multiplying the snippet number of the relevant snippet type by the positive occurrence count value of the most-relevant item corresponding thereto to obtain a first product corresponding to the most-relevant item;

repeating the step for obtaining the first product to obtain all the first products corresponding to all the most-relevant items; and summing up all the first products corresponding to all the most-relevant items to obtain the positive frequency.

16. The music recommendation method as claimed in claim 14, wherein the negative frequency calculating step comprises:

multiplying the snippet number of the relevant snippet type by the negative occurrence count value of the most-relevant item corresponding thereto to obtain a second product corresponding to the most-relevant item;

repeating the step for obtaining the second product to obtain all the second products corresponding to all the most-relevant items; and summing up all the second products corresponding to all the most-relevant items to obtain the positive frequency.

17. The music recommendation method as claimed in claim 14, wherein the first threshold is equal to the sum of the positive occurrence count values of all the most-relevant items, and the second threshold is equal to the sum of the negative occurrence count values of all the most-relevant items.

18. The music recommendation method as claimed in claim 12, wherein the clustering algorithm is a density-based spatial clustering of applications with noise (DBSCAN) algorithm, a K-mean clustering algorithm, a clustering using representatives (CURE) algorithm, or a balanced iterative reducing and clustering using hierarchies (BIRCH) algorithm.

19. The music recommendation method as claimed in claim 12, wherein the length of each of the frames is equal to $1/38$ second.

20. A computer-readable recording medium storing a computer program performing the music recommendation method as claimed in claim 12.

* * * * *